United States Patent [19]

Reid, Jr. et al.

[11] Patent Number: 4,536,798

[45] Date of Patent: Aug. 20, 1985

[54] VOLUME CONTROL FOR CATV AND METHOD THEREFOR

[75] Inventors: Sydney J. Reid, Jr., Tempe; Fredrick Zlotnick, Scottsdale, both of Ariz.

[73] Assignee: Motorola, Inc., Schaumburg, Ill.

[21] Appl. No.: 506,152

[22] Filed: Jun. 20, 1983

[51] Int. Cl.³ .......................... H04N 5/62; H04N 7/16
[52] U.S. Cl. ...................... 358/197; 358/86; 358/194.1
[58] Field of Search ............... 358/197, 196, 198, 188, 358/194.1, 86; 455/4, 21, 22, 11, 151, 355

[56] References Cited

U.S. PATENT DOCUMENTS 4,237,485  12/1980  Saito ..................... 358/197
4,258,391   3/1981  Papay .................... 358/197
4,395,734   7/1983  Rypkema ................. 358/194.1

Primary Examiner—Tommy P. Chin
Attorney, Agent, or Firm—Joe E. Barbee

[57] ABSTRACT

A volume control circuit useful for remotely controlling volume through a CATV remote control unit uses a sound carrier demodulator to obtain an intercarrier sound signal. The intercarrier sound signal is further demodulated to obtain a detected audio signal whose amplitude can then be easily controlled by an amplifier. The gain of the amplifier can then be controlled from the remote unit. The detected audio is then remodulated with the RF video carrier. The remodulated audio is then summed with the video signal to provide an RF output signal having amplitude controlled audio.

4 Claims, 2 Drawing Figures

VOLUME CONTROL FOR CATV AND METHOD THEREFOR

This invention relates, in general, to controlling audio volume in television systems, and more particularly, to a method and apparatus for controlling the volume of audio in a television pre-selector system.

Cable television (CATV) systems typically have a tuner or control box which sets on top of a regular television receiver. An RF input signal containing the television signal is normally input to the CATV tuner and an output from the tuner is then connected to the antenna input jack of the television receiver. The output from the CATV tuner, generally, only contains the signal of a preselected channel.

Remote control systems have been devised for controlling the TV channel to which the CATV tuner is set. Some remote control systems also permit increasing or decreasing the audio volume. Such remote audio volume controllers normally require base band tuners plus video IF amplifiers/detectors and sound IF amplifiers/detectors plus remodulators. Some degradation occurs to the video portion of the signal because of the base band decoding-encoding. The degradation to the video can occur in the demodulator, with intermodulation, cross modulation, or third order harmonic products. There is also reduction of the signal to noise ratio of the signal. Some of the noise degradation can also occur during the remodulation process. Accordingly, it would be desirable to provide a separate audio volume control which does not cause degradation of the video signal.

Accordingly, it is an object of the present invention to provide an improved audio volume control useful in television pre-selector systems.

Another object of the present invention is provide an audio volume control useful in a television pre-selector system which does not degrade the video portion of the signal.

Yet a further object of the present invention is to provide a method of processing an audio signal separately from video in a television pre-selector tuning system.

SUMMARY OF THE INVENTION

The above and other objects and advantages of the present invention are provided by, among other things, a sound carrier demodulator which demodulates the intercarrier sound signal from the RF television signal. The sound carrier demodulator also provides an RF reference output. The demodulated intercarrier signal is further demodulated by an audio demodulator to obtain a detected audio signal. The audio signal is then coupled to amplitude control means which is responsive to a control signal. The amplitude control means can then amplify or attenuate the detected audio signal which is coupled to a modulator. The modulator modulates the amplitude controlled detected audio signal with the RF reference signal to provide a modulated output. This modulated output is then combined with the RF television signal which has been passed through an RF sound carrier trap to remove the sound carrier.

It will be understood that the term "CATV" is intended to encompass set-top tuners including those receiving direct broadcasts from satellites or any type of pre-selector system.

The subject matter which is regarded as the present invention is as set forth in the appended claims. The invention itself, however, together with further objects and advantages thereof, may be better understood by referring to the following detailed description taken in conjunction with the accompanying drawings.

The exemplifications set out herein illustrate the preferred embodiments of the invention in one form thereof, and such exemplifications are not to be construed as limiting in any manner.

DETAILED DESCRIPTION OF THE DRAWINGS

Figure 1:
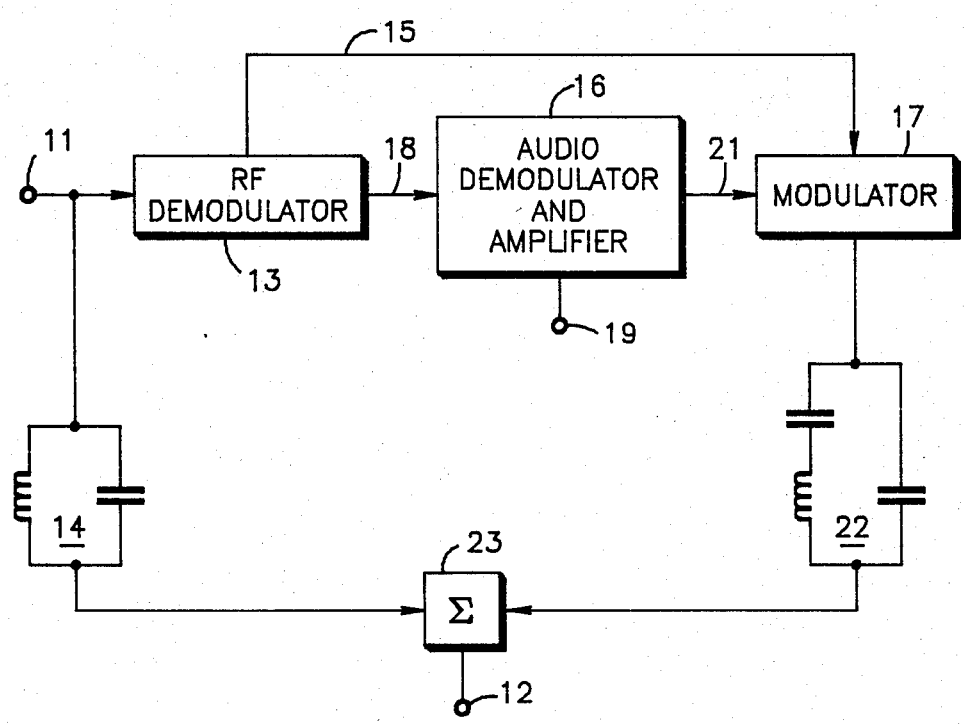
FIG. 1 illustrates in block diagram form an embodiment of the present invention.

FIG. 1 shows in block diagram form a circuit which allows remote control of the volume and mute functions in a cable television (CATV) type of tuning system. The circuit of FIG. 1 can perform the audio volume control functions without introducing signal to noise degradation in the video path. This circuit is also useful in video cassette recorder (VCR) equipment if the equipment is used in a mode where it passes the signal into the television receiver antenna input jack.

Many modern day television receivers can be remote controlled. These modern television receivers also have the capability of having the volume increased, decreased, or muted through the remote control. In such cases, it is easy to remotely control the audio because the television receiver itself has already separated the audio from the video and therefore the signals can be easily controlled independently. However, most video cassette recorders and CATV tuners are used merely in a feed through mode meaning that their signal is received external from the television receiver and then fed into the receiver through the antenna jack. In order to be able to control the audio remotely it was necessary to manipulate the video base band. This resulted in a degradation of the video signal. The circuit illustrated in FIG. 1 can be used to remotely control or mute the audio volume without introducing the degradation to the video signal.

The circuit of FIG. 1 has an RF input terminal 11 and an output terminal 12. Terminal 11 provides an RF television signal to RF demodulator 13 and to RF sound carrier trap 14. Sound carrier demodulator 13 provides an intercarrier sound signal on line 18 and an RF reference signal on line 15. Line 18 is connected to an input of audio demodulator/amplifier 16. Audio demodulator 16 provides a detected audio signal to the audio amplifier within demodulator 16. The amplifier receives a control input from terminal 19. Terminal 19 can receive a DC voltage which is used to either increase or decrease the gain of the amplifier contained in audio demodulator 16. The amplifier output is provided on line 21 which is connected to modulator 17. Modulator 17 also receives the RF reference signal from demodulator 13 by way of line 15. Modulator 17 remodulates the detected audio signal with the RF reference signal. The remodulated signal is then passed to filter network 22. Filter network 22 serves as an upper sideband pass network. The output of filter network 22 is connected to a summer 23. Summer 23 also receives the output from RF sound carrier trap 14. The output from trap 14 is video since the trap has removed the sound therefrom. Summer 23 recombines the video signal and the RF audio signal to provide an RF television output signal at terminal 12. This RF output signal can then be coupled to a television receiver antenna jack (not shown).

The method of operation of the circuit of FIG. 1 is to receive the RF input at terminal 11 which is connected to demodulator 13 and RF sound carrier trap 14. The RF input is demodulated to obtain an intercarrier signal which is coupled to demodulator 16. Demodulator 13 also provides an RF reference signal on line 15. Demodulator 16 also contains a voltage controlled amplifier which receives a control input from terminal 19. The control signal for terminal 19 can be actuated by a remote control device. Demodulator/amplifier 16 provides an FM detected audio signal which is amplified, attenuated, or muted by the voltage controlled amplifier. This detected audio is then modulated by modulator 17 with the RF reference signal supplied on line 15. The modulated audio signal is then coupled to a summation network 23 where it is combined with the video signal supplied by trap 14, to provide an RF television signal which contains an amplitude controlled audio portion.

Figure 2:
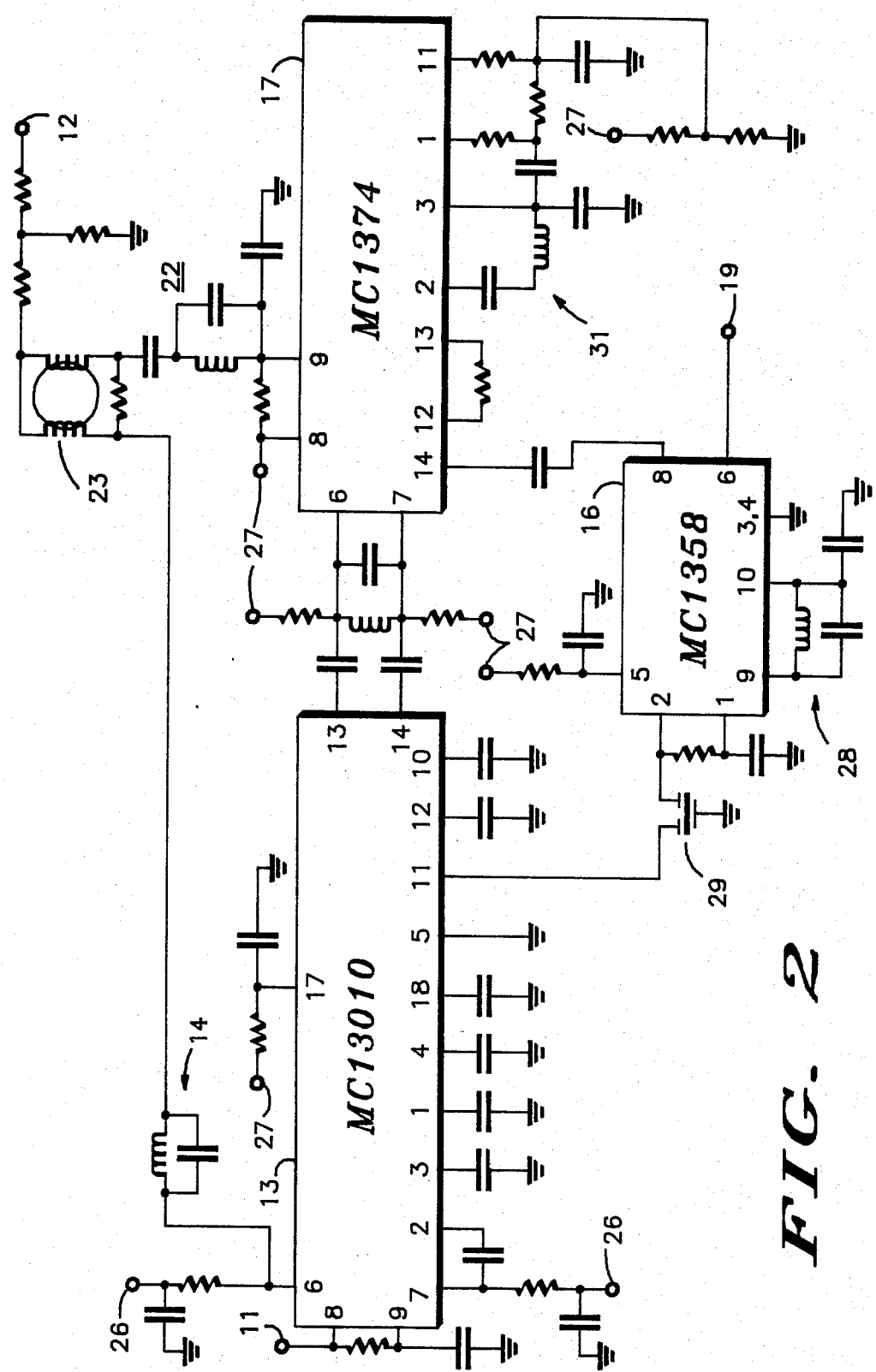
FIG. 2 illustrates in block diagram form a more detailed implementation of the present invention.

FIG. 2 illustrates one manner of achieving the circuit of FIG. 1 by using standard readily available integrated circuits. The elements in FIG. 2 which perform functional equivalents to elements of FIG. 1 carry the same reference numerals. An MC13010 can be used to perform the demodulation function of demodulator 13. An MC1358 can be used to perform the audio demodulation plus amplitude control of the demodulated signal of demodulator/amplifier 16. An MC1374 can be used to provide the remodulation function of modulator 17. MC13010, MC1358, and MC1374 are all standard monolithic integrated circuits made and sold by Motorola, Inc. Illustration of FIG. 2 is not meant to imply that other standard integrated circuits could not be used. The use of other integrated circuits could result in dividing the functions up in a slightly different manner. Actually, in a preferred embodiment, all the active components required to perform the function illustrated in FIG. 1 will be on a single monolithic integrated circuit.

In FIG. 2, RF input terminal 11 is connected to pin 8 of MC13010 which is illustrated as serving as demodulator 13. Pin 8 is connected to pin 9 by a resistor which in turn is coupled to ground by a capacitor. Pin 6 is connected to RF sound carrier trap 14 and to a resistor. The resistor is connected to a voltage terminal 26 which receives a regulated bias voltage. Terminal 26 is also connected to ground by a capacitor. Voltage VCC is applied to terminal 27 which is coupled to pin 17 by a resistor. Pin 17 is also coupled to ground by a capacitor. An RF reference signal is provided as outputs from MC13010 on pins 13 and 14 which are coupled by coupling capacitors to a tuned circuit. Pin 7 of MC13010 is coupled by a resistor to the regulated bias voltage terminal 26. Terminal 26 is also coupled to ground by a capacitor and pin 7 is coupled by a capacitor to pin 2. Pins 1, 3, 4, 10, 12 and 18 are coupled to ground by capacitors. Pin 5 is a ground pin and is therefore connected to ground. Pin 11 provides an output to filter 29. Filter 29 is a ceramic filter which passes the intercarrier sound signal.

The output of filter 29 is connected to pin 2 of MC1358 which is illustrated as serving as audio demodulator/amplifier 16. Pin 2 of MC1358 is coupled to pin 1 by a resistor and pin 1 is coupled to ground by a capacitor. Pin 5 is a power supply pin and is coupled to VCC terminal 27 by a resistor and to ground by a capacitor. Pins 9 and 10 of MC1358 are connected to a tank circuit which provides an FM demodulation quadature signal. Pins 3 and 4 are connected to ground. Pin 7, 11, 12, 13, and 14 are not used in this illustrated configuration and therefore have no connections thereto. Pin 6 receives the DC attenuation control voltage from terminal 19. Pin 8 is the output for demodulator/amplifier 16 and is coupled by a capacitor to pin 14 of MC1374.

Pins 6 and 7 of MC1374, which performs the remodulation function of modulator 17, receive the RF carrier signal through a tuned circuit. The tuned circuit is chosen to provide an oscillation at the RF video frequency of 61.25 MHz. Pins 12 and 13 of MC1374 are coupled together by a resistor. Pin 2 is coupled to pin 3 by a capacitor and a coil in series, and pin 3 is also coupled to ground by a capacitor and coupled to pin 1 by a capacitor and resistor in series. The junction formed by the series capacitor and resistor is coupled by a resistor to another resistor which is connected to pin 11 and to a capacitor which is connected to ground and to a voltage divider network which is connected between pin 27 and ground. Pin 8 is also connected to voltage terminal 27 and to pin 9 by a resistor. Pin 9 provides the modulated audio output to upper sideband pass network 22. Network 22 along with trap 14 provide inputs to summer 23 which is illustrated as a torroidal summer network. The output of summer network 23 is coupled through a T resistor network to output terminal 12.

By now it should be appreciated that there has been provided a separated audio volume control useful in CATV tuners and in video cassette recorders. One implementation of the control has been illustrated using standard integrated circuits.

Consequently, while in accordance with the patent statutes there has been described what at present are considered to be the preferred forms of this invention it will be obvious to those skilled in the art that numerous changes and modifications may be made herein without departing from the spirit and scope of the invention, and it is therefor aimed in the following claims to cover all such modifications.

I claim:

1. Volume control for a television pre-selector tuning system having an input terminal and an output terminal, comprising: a sound carrier demodulator coupled to the input terminal for demodulating an intercarrier sound signal from an RF input signal, the sound carrier demodulator providing an intercarrier sound signal output and an RF reference output; an audio demodulator coupled to the sound carrier demodulator for receiving the intercarrier sound signal and for providing a detected audio output; means for controlling amplitude coupled to the audio demodulator for receiving the detected audio and for controlling amplitude of the detected audio; a modulator coupled to the means for controlling amplitude and coupled to the RF reference output for remodulating the detected audio with the RF reference output and providing a remodulated output; and a means for summing coupled to the remodulating output and the input terminal for summing the remodulated output, which contains the amplitude controlled audio, with a video portion of the RF input.

2. The volume control of claim 1 further including an RF sound carrier trap coupled between the input terminal and the means for summing to provide the video portion of the RF input.

3. A method for controlling amplitude of audio in a television pre-selector tuning system, comprising: demodulating an RF input signal which contains TV video and audio to obtain an intercarrier sound signal and an RF sound carrier signal; demodulating the intercarrier sound signal to obtain a detected audio signal; amplitude controlling the detected audio signal to obtain an amplified or attenuated detected audio signal; modulating the amplitude controlled detected audio signal with the RF sound carrier signal; removing the audio from the RF input signal to obtain a TV video signal; and summing the modulated audio and the TV video signal to obtain an RF signal containing the TV video signal and the amplitude controlled audio.

4. Separated audio volume control for use with a television pre-selector tuning system, comprising: a sound carrier demodulator for extracting an intercarrier sound signal and an RF reference signal from a television signal containing video and audio; an audio demodulator for receiving the intercarrier sound signal and for providing a detected audio signal; a voltage controlled amplifier coupled to the audio demodulator for receiving the detected audio and controlling amplitude of the detected audio in response to a voltage input; a modulator for receiving the amplitude controlled detected audio and modulating the amplitude controlled detected audio with the RF reference signal; an RF sound carrier trap for blocking an RF sound carrier from the television signal and providing the video signal; and a summer for combining the modulated amplitude controlled detected audio with the video signal to provide an RF television signal.

* * * * *